United States Patent Office 3,487,118
Patented Dec. 30, 1969

3,487,118
PREPARATION OF DIHYDROMYRCENOL
Jack H. Blumenthal, Oakhurst, N.J., assignor to International Flavor & Fragrances Inc., New York, N.Y., a corporation of New York
No Drawing. Filed Oct. 17, 1966, Ser. No. 586,922
Int. Cl. C07c 29/06
U.S. Cl. 260—631.5                        3 Claims

ABSTRACT OF THE DISCLOSURE

An improved process for the production of dihydromyrcenol and/or dihydromyrcenyl formate which comprises mixing dihydromyrcene, formic acid, and acid catalyst and maintaining the mixture at a reaction temperature not substantially above 40° C. to form dihydromyrcenol and/or its ester, the process being carried out with from about 0.5 to about 20% catalyst (based on formic acid) and the mixture being maintained at the reaction temperature for a time insufficient to form substantial amounts of cyclic material.

---

This invention relates to novel processes for the treatment of terpene derivatives, and more particularly, it relates to an improved process for the preparation of dihydromyrcenol.

Processes for the preparation of dihydromyrcenol, also known as 2,6-dimethyl-7-octene-2-ol, from various terpene and terpene derivatives are known. For example, Webb U.S. Patent 2,902,510 contains examples showing the preparation of the alcohol in admixture with other materials. While such prior art processes are capable of producing dihydromyrcenol and the dihydromyrcenol so formed can usually be separated from the reaction mixture to produce a pure material, generally the conversions from the reactions of the prior art are quite low, being of the order of 20–22%. A further problem and one which is at least equally as severe as the low conversions is the time required to produce even such conversions of dihydromyrcenol, times of the order of 3–6 days being required.

This invention provides an inexpensive, straight-forward, and rapid process for the production of dihydromyrcenol in good conversions.

Further and more specific objects, features and advantages will clearly appear from the detailed description given below.

The invention accordingly comprises the novel processes and steps of processes, specific embodiments of which are described hereinafter by way of example and in accordance with which it is now preferred to practice the invention.

According to the process of this invention, dihydromyrcenol is prepared by forming a mixture of dihydromyrcene, formic acid, and an acid catalyst and maintaining this mixture at a temperature not substantially above 40° C. for a period of time sufficient to form the dihydromyrcenol and/or dihydromyrcenyl formate, and insufficient to form appreciable amounts of undesired by-products such as cyclic material. The desired dihydromyrcenyl materials (dihydromyrcenol and/or its ester) are then recovered from the reaction mixture by any suitable technique. The amount of acid catalyst used is substantially less than the amount of formic acid and generally should not exceed 20% of the amount of the formic acid. The percentage amounts of acid catalyst used are all based on the amount of formic acid present. Unless otherwise indicated, all parts, proportions, percentages and ratios herein are by weight.

It has been found that preparation of dihydromyrcenol according to the process of this invention gives good conversions of the dihydromyrcene to the alcohol. As used herein, "conversion" is 100 times the number of moles of dihydromyrcenyl material produced divided by the number of moles of starting material (dihydromyrcene).

It has been found that good conversions are rapidly obtained according to this invention when the formation of cyclic material is prevented or kept at a low level. The chief cyclic material obtained is α,3,3-trimethyl cyclohexyl methyl formate; the formation of this cyclic material becomes appreciable at about the point in time of maximum conversion of dihydromyrcene to dihydromyrcenyl material. Further prolonged reaction of the dihydromyrcene with the mixture of formic and mineral acids results only in the formation of the cyclic material and does not improve the conversion. In fact, the amount of dihydromyrcenyl material in the reaction mixture decreases with this prolongation of the reaction due to its conversion to cyclic material. A substantial amount of cyclic material is an amount in excess of 8–10%, and the amount of cyclic material is preferably maintained below 5%, generally, 1–2%, with stronger acid catalysts. The cyclic material appears in gas-liquid chromatograms as a peak eluting beyond those due to the dihydromyrcenol and dihydromyrcenyl formate. The chromatograms are preferably made using helium carrier gas, with a high molecular weight polyethylene glycol, such as Carbowax "20M" as the liquid phase.

Accordingly, the process for this invention provides high conversion to dihydromyrcenyl material, while at the same time minimizing or preventing the formation of cyclic materials which needlessely consume dihydromyrcene, render the separation of dihydromyrcenol from the reaction mixture more complex, and reduce the conversion to dihydromyrcenol. The formation of such cyclic materials is minimized by teminating the reaction at or before the time when the cyclic material begins to appear in substantial quantities, as disclosed hereinafter.

The material herein designated by the term "dihydromyrcene" is also known as 2,6-dimethyl-2-7- octadiene. This material can be supplied to the reaction mixture either as a chemically pure material or as commercially available materials containing approximately 90–95% of dihydromyrcene.

The formic acid can be supplied to the reaction mixture as either the pure material or as an equeous material, desirably one containing at least 90% formic acid. The crude product formed by my process consists mainly of the formate ester; however, the amount of dihydromyrcenol present increases directly wtih the water content of the reaction mixture. Minor amounts of acetic acid can be used with the formic acid, but the use of formic acid as such is preferred.

The temperature of the process of this invention should desirably not exceed 40° C. At temperatures higher than this, the cyclic material appears before good conversions of the dihydromyrcene to dihydromyrcenol are obtained. On the other hand, despite the high activity afforded by the acid catalyst, the reaction rate is quite low at temperatures below about 0° C. It is accordingly desirable that the processes of this invention be carried out at temperatures in the range of from 0° to about 40° C. Since optimum yields or conversions are obtained in minimum time at temperatures in the range of from about 10° to about 30° C., such temperature range is especially preferred.

The catalysts used in this invention are defined as "acid catalysts" which are relatively strong, and more particularly, these acid catalysts are strong protonic acids (proton donor acids) including mineral acids such as sulfuric, polyphosphoric, and perchloric acids and the like, sulfonic acids such as alkyl- or aryl- substituted acids like methane sulfonic, benzene sulfonic and toluene sulfonic acid and the like, and acidic ion exchange resins such as sulfonated polymers, and aprotic Lewis acids such as boron trifluoride, stannic chloride and the like. Formic or other carboxylic acids of similar strength are not suitable acid catalysts according to this invention. The amount of acid catalyst used in the process is interrelated with the temperature at which the reaction is carried out. Generally, quantities of catalysts up to 10–20% can be utilized at temperatures around 0° C. or with some of the slower-acting acid catalysts. Toward the high end of the temperature range, for example, at about 30° C., 1% or less of the catalyst can be utilized. It is accordingly desirable to use from about 0.5 to about 15% acid catalyst, and it is especially preferred to use from about 1 to about 10% catalyst.

The time required to carry out the reaction varies inversely with the temperature, and can conveniently be ascertained in the practice of this invention by analyzing small quantities of the reaction mixture for the presence of cyclic material which appears and reduces the conversion to dihydromyrcenol. While the reaction can be controlled so as entirely to prevent the formation of any cyclic material, it has been found that optimum conversions are generally obtained at the point where small quantities, up to a few percent, of the cyclic material are present in the reaction mixture.

The time required will also vary inversely with the concentration of the catalyst used. Thus, good conversions in excess of 30% are obtained, for example, in 21 hours at 25–30° C. with one percent sulfuric acid, while equally good conversions are obtained in about one hour with 7.5% sulfuric acid at the same temperature. Good conversions are also obtained at 5–10° C. in about 5 hours with a 10% sulfuric acid concentration, and accordingly it is preferred to utilize times less than about 24 hours. Times less than 12 hours are especially preferred. Generally, under conditions providing good conversions of dihydromyrcene to dihydromyrcenyl material and which minimize the formation of the cyclic material, times of at least one hour are used. Accordingly, the preferred times used in carrying out the processes of this invention range from about one to about 12 hours.

The process of my invention can be carried out at sub- or super-atmospheric pressures, but it is most convenient to carry out the process at normal atmospheric pressure. The dihydromyrcene, formic acid, and catalyst can be admixed in any order, but it is preferred to conduct the reaction so that the acid catalyst is not directly admixed with the dihydromyrcene. The ratio of dihydromyrcene to formic acid can vary over a wide range, and a moderate excess of either material can be used.

An inert diluent or vehicle can be combined with the components of the reaction mixture if it is desired to moderate the temperature or change the viscosity of the reaction mass. Generally, such measures are unnecessary, and it is preferred to carry out the process without diluents or vehicles.

The dihydromyrcenol is obtained chiefly as the formate ester. The alcohol itself is recovered from the ester by saponification or hydrolysis. Such saponification is carried out by treating the ester with aqueous or alcoholic alkali, hydroxides and carbonates. Lower alcoholic alkalies, such as methonolic and ethanolic alkalies, are preferred for this purpose.

The dihydromyrcenyl material can be separated from the unreacted hydrocarbon and other materials prior to hydrolysis, or the dihydromyrcenol can be isolated after hydrolysis of the reaction product mixture. The crude dihydromyrcenol or the formate thereof can be purified by any suitable technique, such as distillation.

It is generally desirable to wash the reaction mixture with water after completion of the reaction and to separate the organic layer. The aqueous layer can then be extracted with an organic solvent such as benzene to recover most of the remaining organic product and starting material therein. The organic layer is then subjected to a solvent extraction for the dihydromyrcenyl materials or, desirably, a fractional distillation to provide purified dihydromyrcenyl material.

The following examples are given to illustrate embodiments of the invention as it is now preferred to practice it. It will be understood that the examples are illustrative, and the invention is not to be considered as restricted thereto except as indicated in the appended claims.

Example I

A mixture of 150 g. of 90% formic acid and 7.5 g. of sulfuric acid is prepared and cooled to 15° C. Thereupon, 220 g. of dihydromyrcene having a purity of 94% is slowly added to the mixture over a period of 15 minutes with constant stirring and cooling to maintain the temperature in the range of 15–20° C. The mixture is then stirred, while maintaining the temperature at about 20° C. until the cyclic material begins to form as shown by the appearance of the peak due to this material on a gas-liquid chromatogram (GLC). This will be in about 5 hours. The chromatographic column used is 8 feet long by ¼ inch in diameter. The liquid stationary phase is "Carbowax 20M" polyethylene glycol on a support of 60/80-mesh silicone-treated "Chromosorb W" earth.

The dihydromyrcenol is then recovered from the reaction mixture by pouring the reaction mixture into an equal volume of water, permitting the layers to separate and decanting. The aqueous layer is extracted with 100 cc. benzene which is then added to the organic layer. The combined organic material is washed once with half its volume of water, and the washed organic material is hydrolyzed by refluxing it with a mixture of 100 g. methanol, 45 g. of 50% sodium hydroxide, and 32 g. of water for two hours while the pH is maintained about 10. The hydrolyzed mixture is cooled and 100 cc. of water is added. The methanol is recovered at atmospheric pressure by distillation to a pot temperature of 90° C. The washed product weighs 193 g. and tests 57.4% dihydromyrcenol, a 47% conversion. GLC indicates 1.6% of the cyclic material. The crude mixture is fractionated to obtain the pure dihydromyrcenol.

When the foregoing experiment is repeated using only formic acid without any sulfuric acid, 72-hour reaction time at 25–30° C. results in a conversion of dihydromyrcene to dihydromyrcenol of only 8%.

Example II

To 600 g. of 97.6% formic acid at 5° C. is added 12 g. of methane sulfonic acid with cooling and stirring followed by the addition at 5–10° C. of 880 g. of dihydromyrcene over a period of 30 minutes. The mixture is stirred at 10° C. for 1.5 hours, after which 10.5 g. of sodium formate is added to neutralize the catalyst. The unreacted formic acid plus some of the unreacted dihydromyrcene is distilled off under a vacuum of 20 mm. Hg to a pot temperature of 60° C.

The residue weighs 913 g. and analyzes 59% dihydromyrcenyl formate (50% conversion). GLC indicates the presence of dihydromyrcenol, dihydromyrcenyl formate and cyclic material in the ratio 8:87:5.

Examples III–X

The procedure of Example I is repeated at various temperatures and concentrations of formic acid and catalysts, and the results obtained are as follows:

| Example | Catalyst | Percent | Temp. (°C.) | Time (hrs.) | Formic acid | Conversion to dihydromyrcenol (percent) | Cyclic alcohol as percent of dihydromyrcenol |
|---|---|---|---|---|---|---|---|
| III | 96% sulfuric acid | 5 | 20 | 5.5 | 90 | 47 | 1.6 |
| IV | 70% perchloric acid | 7.5 | 20 | 3 | 90 | 34 | 1.5 |
| V | 96% sulfuric acid | 1 | 20 | 1 | 99 | 44 | 1 |
| VI | BF₃ etherate | 1 | 20 | 4 | 99 | 37 | 1 |
| VII | Polyphosphoric acid | 10 | 20 | 1 | 99 | 50 | 6.7 |
| VIII | Methan sulfonic acid | 3 | 10 | 3 | 99 | 64 | 8 |
| IX | Amberlyst #15 sulfonic acid resin (Rohm & Haas). | 20 | 20 | 1 | 99 | 37 | 7.5 |
| X | Stannic chloride | 5 | 20 | 1 | 99 | 45 | 5.6 |

What is claimed is:

1. A process for preparing dihydromyrcenol which comprises reacting a mixture of dihydromyrcene, formic acid, and from about 0.5 to about 20% by weight based on the weight of formic acid of an acid catalyst selected from the group consisting of mineral acids, organic sulfonic acids, sulfonic acidic ion-exchange resins and aprotic Lewis acids at a temperature of from about 5° to 20° C. for a period of up to about 5 hours, hydrolyzing the dihydromyrcenol product obtained, and recovering dihydromyrcenol.

2. The process of claim 1 wherein the amount of catalyst is from about 1 to about 10%.

3. The process of claim 1 wherein the catalyst is sulfuric acid.

References Cited

UNITED STATES PATENTS 2,902,510  9/1959  Webb _____ 260—489

LORRAINE A. WEINBERGER, Primary Examiner

V. GARNER, Assistant Examiner

U.S. Cl. X.R.

260—489, 497